United States Patent [19]

Longobardo

[11] Patent Number: 5,385,593
[45] Date of Patent: Jan. 31, 1995

[54] SELENIUM ENCAPSULATION FOR PRODUCING COLORED GLASS

[75] Inventor: Anthony V. Longobardo, Butler, Pa.

[73] Assignee: PPG Industries, Inc., Pittsburgh, Pa.

[21] Appl. No.: 38,304

[22] Filed: Mar. 29, 1993

[51] Int. Cl.$^6$ .......................... C03B 1/00; C03C 6/00; C03C 1/00; C03C 3/076

[52] U.S. Cl. .............................. 65/17.1; 65/DIG. 11; 65/134.3; 501/27; 501/32; 501/55; 501/72

[58] Field of Search .................. 65/134, DIG. 11, 17; 501/27, 32, 55, 72; 106/286.8, 287.34, 600, 623

[56] References Cited

U.S. PATENT DOCUMENTS

| | | | |
|---|---|---|---|
| 1,983,151 | 12/1934 | Silverman | 501/27 |
| 2,224,791 | 12/1940 | Löffler | 501/27 |
| 2,229,416 | 1/1941 | Lyle | 501/27 |
| 2,414,413 | 1/1947 | Paulish et al. | 501/27 |
| 2,418,684 | 4/1947 | Youel | 501/27 |
| 2,955,948 | 10/1960 | Silverman | 501/27 |
| 3,291,585 | 12/1966 | Okamura | 65/18 |
| 3,628,932 | 12/1971 | Inoue et al. | 65/18 |
| 3,656,928 | 4/1972 | Gimenez | 65/121 |
| 3,759,684 | 9/1973 | Gimenez | 65/145 |

OTHER PUBLICATIONS

"Selenium Dioxide As A Constituent of Glasses", Louis Navias and John Gallup, pp. 441–449.
Ceramic Abstracts, vol. 18, Manufacture of selenium rose and selenium ruby, p. 152.
Ceramic Abstracts, vol. 14, No. 10, Intermediate reactions during fusing of selenium and some of its compounds in a soda–lime–silicate glass frit, p. 244.
"Selenium in Oxide Glasses Methods for Increased Retention", W. C. LaCourse, M. Ott-teneyck and B. Ukwu, Nov. 1980, American Glass Review, pp. 6–9.
"Mechanism of selenium pink colouration in glass", A. Paul, Journal of Materials Science 10 (1975), pp. 415–421.
"Behavior of Selenium In Glass", The Glass Industry, Jul. 1934, pp. 122–125.
"Oxidation–Reduction Equilibria In Glass Between Iron and Selenium In Several Furnace Atmospheres", Frank Day, Jr. and Alexandra Silverman, Journal of The American Ceramic Society, vol. 25, No. 13, pp. 371–381, 1942.
"Iron–selenium black glass", A. Paul, Physics and Chemistry of Glasses, vol. 14, No. 5, Oct. 1973, pp. 96–100.
"The Behavior of Selenium and Its Compounds During the Melting of a Vitrifiable Batch", S. A. Glaverbel, Central Laboratory, Gilley, 1967.

*Primary Examiner*—W. Gary Jones
*Assistant Examiner*—Steven P. Griffin
*Attorney, Agent, or Firm*—Andrew C. Siminerio

[57] ABSTRACT

The present invention provides a glass forming composition for encapsulating selenium which includes, by weight percent of raw materials, 20 to 50% silica and 50 to 80% alkali and alkaline earth materials. The composition has a liquidus temperature between 600° to 1200° C., preferably up to 1000° C., and a viscosity up to 10,000 Poise at said liquidus temperature, preferably up to 5,000 Poise. The alkali and alkaline materials preferably include at least one group of materials combined in an approximate eutectic molar ratio. In one particular embodiment of the invention, the alkali and alkaline earth materials include groups of nitrates, such as $KNO_3$, $NaNO_3$ and/or $Ca(NO_3)_2$, and/or carbonates, such as $K_2CO_3$, $Na_2CO_3$ and/or $Li_2CO_3$.

18 Claims, No Drawings

SELENIUM ENCAPSULATION FOR PRODUCING COLORED GLASS

BACKGROUND OF THE INVENTION

This invention relates to the preparation of selenium for incorporation into a glass batch.

Selenium is an important additive for making various heat absorbing and colored glass. It has been used in the glass industry for more than 100 years to produce colors from pink to red to blue and even as a de-colorizing agent by compensating for the blue green color resulting from the incorporation of ferrous ($Fe^{2+}$) material. Its desirable coloring properties and long history of wide spread use, however, do not speak of the difficulties involved in its utilization.

Selenium is considered one of the most expensive components of a soda lime silica glass batch. Fortunately, only parts per million (PPM) levels are needed for most coloring needs. However, concerns about selenium's extreme volatility outweigh the small amounts required for coloration.

The volatilization of selenium and its compounds are of important technological significance to glass makers. According to conventional practice, in most cases the selenium, in the form of metal or selenium compounds, is mixed and melted with other total amounts of the raw materials for the glass. Selenium losses of nearly 85% are common in glass production facilities. Selenium is so thermally unstable that volatilization for the metallic state begins at about 200° C. (which is below its melting point of 217° C.). The economic and corresponding environmental costs of selenium volatility are therefore of great concern.

There are only two forms of selenium which produce color in soda lime silica glass, namely, selenium in its elemental state ($Se^o$) and polyselenide state ($Se_x^{2-}$). The neutral form creates a pink color whereas the polyselenide's contribution depends on the associated species, for example, FeSe produces red brown color. The other possible forms of selenium in the vitreous state $Se^{2-}$, $Se^{4+}$ and $Se^{6+}$ are colorless. Glass redox, therefore, will have great influence on the final color of the glass. Clearly the problems associated with selenium go beyond just its retention in the melt and must address the efficient development of the correct color of the final glass product. As a starting point, however, selenium must be retained before dealing with the resulting color.

One method of retaining selenium is to combine the selenium with either glass cullet or a portion of the glass batch material and sinter the resulting mixture as disclosed in U.S. Pat. Nos. 3,291,585 and 3,628,932. The sintered material is then recombined with the glass batch and melted.

It would be advantageous to provide a system of adding selenium to a glass batch without the necessity of pre-reacting the selenium prior to adding it to the glass batch.

SUMMARY OF THE INVENTION

The present invention provides a glass forming composition for encapsulating selenium which includes, by weight percent of raw materials, 20 to 50% silica and 50 to 80% alkali and alkaline earth materials. The composition has a liquidus temperature between 600° to 1200° C., preferably up to 1000° C., and a viscosity up to 10,000 Poise at its liquidus temperature, preferably up to 5,000 Poise. The alkali and alkaline materials preferably include at least one group of materials combined in an approximate eutectic molar ratio. In one particular embodiment of the invention, the alkali and alkaline earth materials include groups of nitrates, such as $KNO_3$, $NaNO_3$ and/or $Ca(NO_3)_2$, and/or carbonates, such as $K_2CO_3$, $Na_2CO_3$ and/or $Li_2CO_3$.

The present invention also includes a selenium containing glass forming composition which includes, by weight percent of raw materials, 18 to 50% silica, 45 to 80% alkali and alkaline earth materials and up to 10% selenium. The combination of the silica and the alkali and alkaline earth materials in these glass forming compositions has a liquidus temperature between 600 to 1200° C. and a viscosity up to 10,000 Poise at said liquidus temperature. The alkali and alkaline materials preferably include at least one group of materials combined in an approximate eutectic molar ratio.

The present invention also includes an improved method of producing selenium containing glasses, and in particular, soda lime silica glasses. Prior to combining selenium and batch materials and melting the combined materials, the selenium is encapsulated in a low silica, high alkali glass forming composition that promotes oxidation of selenium and has a liquidus temperature between 600 to 1200° C. and a viscosity up to 10,000 Poise at the liquidus temperature.

DETAILED DESCRIPTION OF THE INVENTION

Selenium will be retained in a glass batch only in an oxide form. When selenium is added to a typical soda lime silica batch of a type well known in the art, it undergoes a solid state oxidation reaction with alkali and alkali earth materials. The following illustrates one such series of reactions:

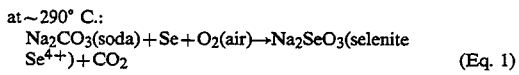
(Eq. 1)

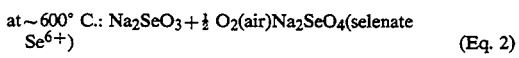
(Eq. 2)

These forms of selenium are more thermally stable than metallic selenium and will remain in a liquefied glass batch material.

In the present invention, selenium is encapsulated in a material that will drive the selenium oxidation reactions to form compositions that better retain selenium at high temperature and better distribute the selenium throughout the glass melt. By providing such a system, the selenium is protected from the high temperatures that would result in its early volatilization soon after being heated so as to increase its potential to be assimilated in the glass melt.

In the present invention, the encapsulating material is a low silica, high alkali material having a low liquidus temperature and high fluidity at its liquidus temperature. The low silica, high alkali nature of the material favors the selenium oxidation reactions as discussed earlier. The low liquidus temperature allows the selenium compounds to be dissolved in the liquefied material earlier in the batch melting process for better retention. The highly fluid nature of the liquefied encapsulant provides high diffusion and dispersion of the selenium ions. All three of these factors combine to yield an environment more suitable for assimilation of the selenium into the glass batch than that found in typical soda-lime-silica glass compositions.

As used herein, low silica, high alkali material means a glass forming composition that is about 20–50% silica and 50–80% alkali and alkaline earth materials measured by weight percent of the raw material used to form the encapsulant. Low liquidus temperature means a temperature in the range of about 600° to 1200° C. (1112° to 2192° F.), preferably less than 1000° C. (1832° F.). High fluidity means a viscosity of about 10,000 Poise (P) or less at its liquidus temperature, preferably less than 5000 Poise.

The following low silica, high alkali compositions were used to encapsulate selenium and were tested to evaluate their effectiveness in retaining selenium in a glass batch during melting. The compositions are disclosed as discrete groupings of chemical compounds. The mole ratios (expressed as a %) describe a nearly eutectic molar ratio for each specific grouping and not the final composition. Similarly, the liquidus temperatures given are for each specific group, e.g. a nitrate group or a carbonate group. The group liquidus temperatures are shown to illustrate that the combined liquidus temperature for the encapsulant is greatly influenced by the nearly eutectic mixtures of alkali and alkaline earth material groups. The viscosity for each composition was measured at its combined liquidus temperature. The measured temperatures and viscosities are approximate due to the influence of water and impurities on the melting temperature.

| Material | Mole Ratio (%) | Liquidus Temp. (°C.) | Wt. % of Raw Mat'l |
|---|---|---|---|
| COMPOSITION A | | | |
| $KNO_3$ | 36) | | 20% |
| $NaNO_3$ | 30) | ~200° C. | 20% |
| $Ca(NO_3)_2$ | 34) | | 20% |
| $SiO_2$ (−200 mesh sand) | | ~1720° C. | 40% |
| Combined Liquidus Temperature: ~1204° C. | | | |
| Viscosity: ~5000P | | | |
| COMPOSITION B | | | |
| $KNO_3$ | 36) | | 25% |
| $NaNO_3$ | 30) | ~200° C. | 25% |
| $Ca(NO_3)_2$ | 34) | | 25% |
| $SiO_2$ (−200 mesh sand) | | ~1720° C. | 25% |
| Combined Liquidus Temperature: ~1204° C. | | | |
| Viscosity: ~1000P | | | |
| COMPOSITION C | | | |
| $KNO_3$ | 36) | | 10% |
| $NaNO_3$ | 30) | ~200° C. | 10% |
| $Ca(NO_3)_2$ | 34) | | 10% |
| $Na_2CO_3$ | 57) | ~740° C. | 15% |
| $K_2CO_3$ | 43) | | 15% |
| $SiO_2$ (−200 mesh sand) | | ~1720° C. | 40% |
| Combined Liquidus Temperature: ~785° C. | | | |
| Viscosity: ~2000P | | | |
| COMPOSITION D | | | |
| $KNO_3$ | 36) | | 16.67% |
| $NaNO_3$ | 30) | ~200° C. | 16.67% |
| $Ca(NO_3)_2$ | 34) | | 16.67% |
| $Na_2CO_3$ | 57) | ~740° C. | 13.33 |
| $K_2CO_3$ | 43) | | 13.33% |
| $SiO_2$ (−200 mesh sand) | | ~1720° C. | 23.33% |
| Combined Liquidus Temperature: ~710° C. | | | |
| Viscosity: ~1590P | | | |
| COMPOSITION E | | | |
| $KNO_3$ | 36) | | 12.5% |
| $NaNO_3$ | 30) | ~200° C. | 12.5% |
| $Ca(NO_3)_2$ | 34) | | 12.5% |
| $Na_2CO_3$ | 39) | | 15.0% |
| $K_2CO_3$ | 30) | ~400° C. | 15.0% |
| $Li_2CO_3$ | 31) | | 10.0% |
| $SiO_2$ (−200 mesh sand) | | ~1720° C. | 22.5% |
| Combined Liquidus Temperature: ~750° C. | | | |
| Viscosity: ~1000P | | | |

It should be appreciated that although the silica in the above compositions was provided in the form of fine sand, other $SiO_2$ sources may be used, e.g. clay, feldspar and glass cullet, as well as powdered or liquid (aqueous) alkali silicates.

To evaluate the effectiveness of the encapsulation on selenium retention, metallic selenium was added to each of the compositions at an amount equal to 1% of the total weight of the encapsulant so that the initial selenium concentration was 10,000 PPM.

The encapsulated selenium was prepared as follows. All of the raw materials are initially combined as dry granular material or powders. To achieve the greatest state of mixing, all materials should be as fine as possible, preferably about −120 mesh or less. This is important for materials such as nitrates since these are typically prilled materials. The source of selenium metal is typically −200 mesh. All of the materials are blended in a non-stick container for approximately 1 minute to homogenize the powders. Next, an amount of warm (about 85° C.) deionized water equal to about ⅓ the total dry weight of the powders is slowly added to the mixture to obtain a slurry type mixture. Stirring is continued for about 2 minutes. Mixing with the warm water partially dissolves these alkali materials and aids in mixing on an atomic scale. The nitrates and carbonates are at least partially soluble in warm water. The slurry is then heated in a 100°–130° C. oven until completely dry (experiments have shown about 5% of the water remains). The material is then crushed into a coarse, granular material between 20 to 40 mesh. Based on the selenium content of the mixture, the required amount of selenium may be added to the glass batch. The encapsulated selenium was added to a soda-lime-silica glass batch of the type shown in Table 1 in the amount required to provide an initial selenium concentration of 100 PPM in the glass batch.

TABLE 1

| Material | Weight |
|---|---|
| Sand - $SiO_2$ | 1000 |
| Soda Ash - $Na_2CO_3$ | 310 |
| Limestone - $CaCO_3$ | 86.7 |
| Dolomite - $MgCO_3$ $CaCO_3$ | 246.6 |
| Salt Cake - $Na_2SO_4$ | 5.0 |
| Niter - $NaNO_3$ | 15.0 |
| Rouge - $Fe_2O_3$ | 2.28 |
| blast furnace slag | 10.6 |
| $Co_3O_4$ | 0.053 |

The selenium retention in PPM (and the corresponding retained percentage) for each of the compositions is as follows: Composition A—26, Composition B—31, Composition C—29, Composition D—36 and Composition E—38. As can be seen, those encapsulants having a lower liquidus temperature, due in part to the greater proportion of nitrates, and having greater fluidity, due in part to the lower proportion of silica, provide the greatest selenium retention in the glass batch.

In using the low silica, high alkali glass forming compositions of the present invention to encapsulate selenium, with other typical glass batch materials to form soda lime silica glasses it is recommended that the selenium be no more than 10% by weight of the raw materials used to make the encapsulated selenium, and preferably no more than 5%. It is believed that this limitation is dictated by the ability of the encapsulant to assimilate the selenium.

It should be appreciated that the selenium will also be oxidized by other alkali materials in the encapsulating material. For example, $$Ca(NO_3)_2 + Se \rightarrow CaSeO_3 + NO_x \uparrow \qquad \text{(Eq. 3)}$$

$$CaSeO_3 + \tfrac{1}{2}O_2 \rightarrow CaSeO_4 \qquad \text{(Eq. 4)}$$

and $$K_2CO_3 + Se + O_2 \rightarrow K_2SeO_3 + CO_2 \uparrow \qquad \text{(Eq. 5)}$$

$$K_2SeO_3 + \tfrac{1}{2}O_2 \rightarrow K_2SeO_4 \qquad \text{(Eq. 6)}$$

However, the selenium will preferentially react with the Na (if present) as shown in Equations 1 and 2.

It is also contemplated in the present invention that selenium oxides, such as $Na_2SeO_3$ and $CaSeO_3$, may be encapsulated by low silica, high alkali materials of the type described earlier. One advantage of this type of approach is that when the encapsulated material is added to the batch, there is no delay associated with the oxidation of the selenium. In addition, it reduces the potential of selenium loss through volatilization during oxidation, since the selenium will have already been oxidized. The oxidized selenium compounds are readily assimilated into the encapsulating material so that the selenium compounds properly diffuse throughout the glass batch.

I claim:

1. In a method of producing selenium containing glass compositions including the steps of combining selenium with other batch materials and melting the combined materials, the improvement comprising, prior to combining said selenium and batch materials, encapsulating said selenium in a low silica, high alkali glass forming composition which promotes oxidation of selenium and has a viscosity of up to 10,000 Poise at a temperature between 600° to 1200° C. and subsequently adding said encapsulated selenium to said batch materials.

2. The method as in claim 1 wherein said low silica, high alkali glass forming composition has a viscosity of up to 5,000 Poise at a temperature between 600° to 1000° C.

3. The method as in claim 1 wherein said low silica, high alkali glass forming composition is, by weight percent of raw materials, 20 to 50% silica and 50 to 80% of a member selected from a group consisting of alkali material, alkaline earth material and a mixture thereof.

4. The method as in claim 3 wherein the amount of silica is 20 to 40 wt. %.

5. The method as in claim 3 wherein said member includes nitrates and/or carbonates.

6. The method as in claim 5 wherein said nitrates include $KNO_3$, $NaNO_3$ and/or $Ca(NO_3)_2$ and said carbonates include $K_2CO_3$, $Na_2CO_3$ and/or $Li_2CO_3$.

7. The method as in claim 6 wherein said nitrates and/or carbonates are combined in an approximate eutectic molar ratio.

8. The method as in claim 3 wherein said member includes a plurality of said materials, of said group combined in an approximate eutectic molar ratio.

9. The method as in claim 3 wherein said member is selected from a group consisting of at least two alkali materials, at least two alkaline earth materials, and a mixture of at least one alkali material and one alkaline earth material.

10. The method as in claim 9 wherein said materials of said group are combined in an approximate eutectic molar ratio.

11. The method as in claim 3 wherein said encapsulating step includes the steps of combining said selenium, said silica, and said members of said group as granular materials to form a mixture of a predetermined weight, adding warm deionized water to said mixture, mixing said mixture to at least partially dissolve said members of said group in said water, drying said mixture, and crushing said dried mixture.

12. The method as in claim 11 wherein said adding step includes adding said warm deionized water to said mixture in an amount equal to approximately one third of said weight of said mixture, and said drying step includes the step of heating said mixture.

13. In a method of producing selenium containing glass compositions including the steps of combining selenium with other batch materials and melting the combined materials, the improvement comprising prior to combining said selenium and batch materials, encapsulating said selenium in a low silica, high alkali glass forming composition which promotes oxidation of selenium and is, by weight percent of raw materials, 20 to 50% silica and 50 to 80% of a member selected from a group consisting of alkali nitrate material, alkaline earth nitrate material and a mixture thereof.

14. The method as in claim 13 wherein said low silica high alkali glass forming composition has a viscosity of up to 0,000 Poise at a temperature between 600° to 1200° C.

15. The method as in claim 14 wherein said member includes a plurality of said materials of said group combined in an approximate eutectic molar ratio.

16. The method as in claim 13, wherein said member includes $KNO_3$, $NaNO_3$ and/or $Ca(NO_3)_2$.

17. The method as in claim 13 wherein said encapsulating step includes the steps of combining said selenium, said silica, and said members of said group as granular materials to form a mixture of a predetermined weight, adding warm deionized water to said mixture, mixing said mixture to at least partially dissolve said members of said group in said water, drying said mixture, and crushing said dried mixture.

18. The method as in claim 17 wherein said adding step includes adding said warm deionized water to said mixture in an amount equal to approximately one third of said weight of said mixture, and said drying step includes the step of heating said mixture.

* * * * *

UNITED STATES PATENT AND TRADEMARK OFFICE
CERTIFICATE OF CORRECTION

PATENT NO. : 5,385,593
DATED : January 31, 1995
INVENTOR(S) : Longobardo

It is certified that error appears in the above-indentified patent and that said Letters Patent is hereby corrected as shown below:

Claim 8, column 6, line 8, delete "," after the word "materials".

Claim 14, column 6, line 44, delete "0,000" and insert --10,000--

Signed and Sealed this

Twenty-fourth Day of September, 1996

Attest:

BRUCE LEHMAN

Attesting Officer     Commissioner of Patents and Trademarks